(12) United States Patent
Jung

(10) Patent No.: US 11,070,807 B2
(45) Date of Patent: *Jul. 20, 2021

(54) DATA ENCODING APPARATUS AND DATA ENCODING METHOD

(71) Applicant: Samsung Electronics Co., Ltd., Suwon-si (KR)

(72) Inventor: Young-Beom Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,809

(22) Filed: Aug. 20, 2019

(65) Prior Publication Data

US 2019/0373263 A1    Dec. 5, 2019

Related U.S. Application Data

(63) Continuation of application No. 15/267,543, filed on Sep. 16, 2016, now Pat. No. 10,432,935.

(30) Foreign Application Priority Data

Oct. 16, 2015  (KR) ........................ 10-2015-0144856

(51) Int. Cl.
*H04N 19/124* (2014.01)
*H04N 19/103* (2014.01)
(Continued)

(52) U.S. Cl.
CPC ......... *H04N 19/124* (2014.11); *H04N 19/103* (2014.11); *H04N 19/176* (2014.11); *H04N 19/182* (2014.11); *H04N 19/61* (2014.11)

(58) Field of Classification Search
None
See application file for complete search history.

(56) References Cited

U.S. PATENT DOCUMENTS 7,889,790 B2  2/2011  Sun
8,059,721 B2  11/2011  Chang et al.
(Continued)

FOREIGN PATENT DOCUMENTS

WO  WO-2014/193630 A1  12/2014
WO  WO-2015/007946 A1  1/2015

OTHER PUBLICATIONS

Xu et al., "A Fine Rate Control Algorithm with Adaptive Rounding Offsets (ARO)", IEEE Trans. on Circuits and Systems for Video Technology. vol. 19, No. 10, Oct. 2009, pp. 1424-1435. (Year: 2009).*

(Continued)

*Primary Examiner* — Reza Aghevli
(74) *Attorney, Agent, or Firm* — Harness, Dickey & Pierce, P.L.C.

(57) ABSTRACT

A data encoding apparatus includes a memory storing computer-readable instructions; and one or more processors configured to execute the computer-readable instruction such that the one or more processors are configured to, receive first video data in a macroblock unit, determine a first rounding offset value using the first video data, create second video data by applying the first rounding offset value to the first video data, determine a second rounding offset value, which is different from the first rounding offset value, using the second video data, and create a quantized coefficient by applying the second rounding offset value to the first video data.

15 Claims, 12 Drawing Sheets

(51) Int. Cl.
*H04N 19/176* (2014.01)
*H04N 19/182* (2014.01)
*H04N 19/61* (2014.01)

(56) References Cited

U.S. PATENT DOCUMENTS

| | | | |
|---|---|---|---|
| 9,001,889 B2 | 4/2015 | Lu et al. | |
| 9,635,356 B2* | 4/2017 | Li | H04N 19/51 |
| 9,712,828 B2* | 7/2017 | Dey | H04N 19/174 |
| 10,432,935 B2* | 10/2019 | Jung | H04N 19/182 |
| 2007/0058714 A1 | 3/2007 | Noda | |
| 2007/0147497 A1 | 6/2007 | Bao et al. | |
| 2010/0232498 A1 | 9/2010 | Liu et al. | |
| 2010/0290524 A1* | 11/2010 | Lu | H04N 19/61 375/240.03 |
| 2011/0051807 A1 | 3/2011 | Liu et al. | |
| 2012/0189057 A1* | 7/2012 | Ugur | H04N 19/523 375/240.15 |
| 2012/0219055 A1* | 8/2012 | He | H04N 19/124 375/240.03 |
| 2012/0307890 A1* | 12/2012 | Lu | H04N 19/176 375/240.03 |
| 2013/0272386 A1 | 10/2013 | Yu et al. | |
| 2015/0131719 A1 | 5/2015 | Huang et al. | |
| 2015/0215617 A1* | 7/2015 | Leontaris | H04N 19/117 375/240.03 |
| 2015/0264354 A1* | 9/2015 | Zhang | H04N 19/176 375/240.03 |
| 2016/0057418 A1* | 2/2016 | Lei | H04N 19/136 375/240.03 |
| 2016/0323579 A1* | 11/2016 | Nagayama | H04N 19/136 |
| 2016/0381385 A1* | 12/2016 | Ugur | H04N 19/117 375/240.12 |
| 2017/0111639 A1* | 4/2017 | Jung | H04N 19/176 |
| 2017/0142418 A1* | 5/2017 | Li | H04N 19/174 |
| 2017/0318301 A1* | 11/2017 | Li | H04N 19/126 |

OTHER PUBLICATIONS

Abrahamsson, "Variance Adaptive Quantization and Adaptive Offset Selection in High Efficiency Video Coding", Uppsala University, Feb. 2016, pp. 1-43. (Year: 2016).*

Xu et al., "A Fine Rate Control Algorithm with Adaptive Rounding Offsets (ARO)", IEEE Trans. Circuits and Systems for Video Technology, vol. 19, No. 10, Oct. 2009, pp. 1424-1434. (Year: 2009).

Abrahamsson, "Variance Adaptive Quantization and Adaptive Offset Selection in High Efficiency Video Coding", Uppsala University, UPTEC STS 16004, Feb. 2016, pp. 1-38. (Year: 2016).

Office Action and Search Report for Taiwanese Patent Application No. 10921081300 dated Nov. 9, 2020.

* cited by examiner

|    |    |    |    |
|----|----|----|----|
| a1 | a2 | a3 | a4 |
| b1 | b2 | b3 | b4 |
| c1 | c2 | c3 | c4 |
| d1 | d2 | d3 | d4 |

FIG. 6

|       | ZERO | NON-ZERO |
|-------|------|----------|
| INTRA | K1   | K3       |
| INTER | K2   | K4       |

DATA ENCODING APPARATUS AND DATA ENCODING METHOD

This U.S. non-provisional patent application is a continuation of U.S. application Ser. No. 15/267,543, filed on Sep. 16, 2016, which claims priority from Korean Patent Application No. 10-2015-0144856, filed on Oct. 16, 2015 in the Korean Intellectual Property Office, the entire contents of each of which are incorporated herein by reference.

BACKGROUND

1. Technical Field

At least one example embodiment of the inventive concepts relates to a data encoding apparatus and a data encoding method.

2. Description of the Related Art

With the development and distribution of hardware capable of reproducing and storing high-resolution or high-quality video contents, the necessity of a video codec for effectively encoding or decoding high-resolution or high-quality video contents has increased. According to a conventional video codec, a video is encoded by a limited coding method based on a macroblock having a predetermined size.

A video codec reduces the amount of data by a prediction technique using the characteristics of video images being temporally or spatially correlated with each other at a high degree. According to the prediction technique, image information is recorded using temporal or spatial distance between images, prediction errors, or the like in order to predict the current image using the peripheral image.

SUMMARY

According to at least some example embodiments of the inventive concepts, a data encoding apparatus includes a memory storing computer-readable instructions; and one or more processors configured to execute the computer-readable instruction such that the one or more processors are configured to, receive first video data in a macroblock unit, determine a first rounding offset value using the first video data, create second video data by applying the first rounding offset value to the first video data, determine a second rounding offset value, which is different from the first rounding offset value, using the second video data, and create a quantized coefficient by applying the second rounding offset value to the first video data.

The one or more processors may be configured to execute the computer-readable instruction such that the one or more processors are configured to determine the first rounding offset value depending on a prediction mode or a level value.

The one or more processors may be configured to execute the computer-readable instruction such that the one or more processors are configured to determine the second rounding offset value using the number of data having a level value of 0 between first data and second data.

The data encoding apparatus may further include one-dimensionally arranging the second video data, wherein the first data is final data having a level value of not 0 in the one-dimensionally arranged second video data.

The second data may be data that has a level value of not 0 and is nearest to the first data in the one-dimensionally arranged second video data.

The one or more processors may be configured to execute the computer-readable instruction such that the one or more processors are configured to determine the first or second rounding offset value using a previously stored lookup table.

The one or more processors may be further configured to execute the computer-readable instruction such that the one or more processors are configured to calculate the first or second rounding offset value depending on a first equation.

The rounding offset calculating unit may be disposed in the quantization unit.

The first video data may be data transformed into a frequency domain.

The macroblock unit may include 4×4 pixel or 16×16 pixel.

According to at least some example embodiments of the inventive concepts, a data encoding apparatus includes a memory storing computer-readable instructions; and one or more processors configured to execute the computer-readable instruction such that the one or more processors are configured to, receive 1st to nth video data, determine 1st to nth quantized coefficients based on the 1st to nth video data, n being a natural number equal to or greater than 2, determine 1st to nth rounding offset values based on the 1st to nth quantized coefficients, determine 1st to nth transformed quantized coefficients by applying the 1st to nth rounding offset values to the 1st to nth quantized coefficients, and one-dimensionally arrange the 1st to nth transformed quantized coefficients depending on a first rule.

The one or more processors may be configured to execute the computer-readable instruction such that the one or more processors are configured to determine additional rounding offset values using the one-dimensionally arranged 1st to nth transformed quantized coefficients.

The one or more processors may be configured to execute the computer-readable instruction such that the one or more processors are configured to determine the additional rounding offset values by using a final kth quantized coefficient having a level value of not 0 and a k−1th quantized coefficient that has a level value of not 0 and is nearest to the kth quantized coefficient, among the 1st to nth transformed quantized coefficients.

The one or more processors may be configured to execute the computer-readable instruction such that the one or more processors are configured to determine the additional rounding offset values by using the number of quantized coefficients having a level value of 0 between the kth quantized coefficient and the k−1th quantized coefficient.

The one or more processors may be configured to execute the computer-readable instruction such that the one or more processors are configured to determine the additional rounding offset values by using a lookup table previously stored in memory.

The one or more processors may be configured to execute the computer-readable instruction such that the one or more processors are configured to determine the additional rounding offset values based on a first equation.

According to at least some example embodiments of the inventive concepts, a data encoding apparatus includes a memory storing computer-readable instructions; and one or more processors configured to execute the computer-readable instruction such that the one or more processors are configured to, receive a residual block, transform video data in a spatial domain into video data in a frequency domain to create a transformed coefficient, quantize the transformed coefficient to create a quantized coefficient, and perform an entropy coding for the quantized coefficient to generate an output bit stream, wherein, the quantized coefficient includes a first quantized coefficient and a second quantized coefficient different from the first quantized coefficient, the first quantized coefficient is created by applying a first rounding offset value to the transformed coefficient, and the second quantized coefficient is created by applying a second rounding offset value to the transformed coefficient.

The one or more processors may be configured to execute the computer-readable instruction such that the one or more processors are configured to create the quantized coefficient using a previously stored lookup table.

The one or more processors may be configured to execute the computer-readable instruction such that the one or more processors are configured to calculate the first or second rounding offset value based on a first equation, and create the quantized coefficient based on the first or second rounding offset value.

The one or more processors may be configured to execute the computer-readable instruction such that the one or more processors are configured to determine the first rounding offset value based on a prediction mode or the level value of the first quantized coefficient.

The one or more processors may be configured to execute the computer-readable instruction such that the one or more processors are configured to determine the second rounding offset value by using a number of quantized coefficients having a level value of 0 between the kth quantized coefficient and the k–1th quantized coefficient.

The kth quantized coefficient may be a final kth quantized coefficient having a level value of not 0, and the k–1th quantized coefficient is a quantized coefficient that has a level value of not 0 and is nearest to the kth quantized coefficient.

According to at least some example embodiments of the inventive concepts, a data encoding method includes receiving first video data in a macroblock unit; determining a first rounding offset value using the first video data; creating second video data by applying the first rounding offset value to the first video data; determining a second rounding offset value using the second video data; and creating a quantized coefficient by applying the second rounding offset value to the first video data.

The first rounding offset value may be determined depending on a prediction mode or the level value of the first video data.

The data encoding method may further include one-dimensionally arranging a plurality of data including the second video data between the creating of the second video data and the determining of the second rounding offset value.

The determining of the second rounding offset value may be performed using the number of data having a level value of 0 between first data and second data.

The first data may be final data having a level value of not 0 in the second video data.

The second data may be final data having a level value of not 0 and nearest to the first data in the second video data.

The determining of the first or second rounding offset value may be performed by using a previously lookup table or by performing calculation depending on predetermined equation.

The first video data may be data transformed into a frequency domain.

The macroblock unit may include 4×4 pixel or 16×16 pixel.

According to at least some example embodiments of the inventive concepts, a data encoding apparatus includes a memory storing computer-readable instructions; and one or more processors configured to execute the computer-readable instruction such that the one or more processors are configured to, receive first video data, determine a first multiplication value using a lookup table based on prediction mode associated with the first video data, determine a first rounding offset value based on the first multiplication value, determine a first quantized coefficient based on the first rounding offset value and the first video data, determine a distance value based on a distance between two non-zero coefficient values in the first quantized coefficient, determine a second multiplication value based on the distance value, determine a second rounding offset value based on the second multiplication value, determine a second quantized coefficient based on the second rounding offset value and the first video data, and determine an output data bit stream based on the second quantized coefficient.

The determining the first multiplication value using the lookup table based on the prediction mode associated with the first video data may include transforming the first video data from a spatial domain into a frequency domain to create a transformed coefficient, the prediction mode being a prediction mode associated with the transformed coefficient.

Determining the output bit stream based on the second quantized coefficient may include performing an entropy coding on the second quantized coefficient to generate the output bit stream.

The first quantized coefficient may include a first plurality of coefficient units, and the first plurality of coefficient units may include the two non-zero coefficient units.

Determining the distance value may include arranging the first plurality of coefficient units one-dimensionally; and determining the distance between the two non-zero coefficient units with respect to the one-dimensionally arranged first plurality of coefficient units.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIGS. 3 to 5 are views explaining the operations of a data encoding apparatus according to at least one example embodiment of the inventive concepts;

FIG. 6 is an example view of a lookup table;

DETAILED DESCRIPTION OF THE EMBODIMENTS

Figure 1:
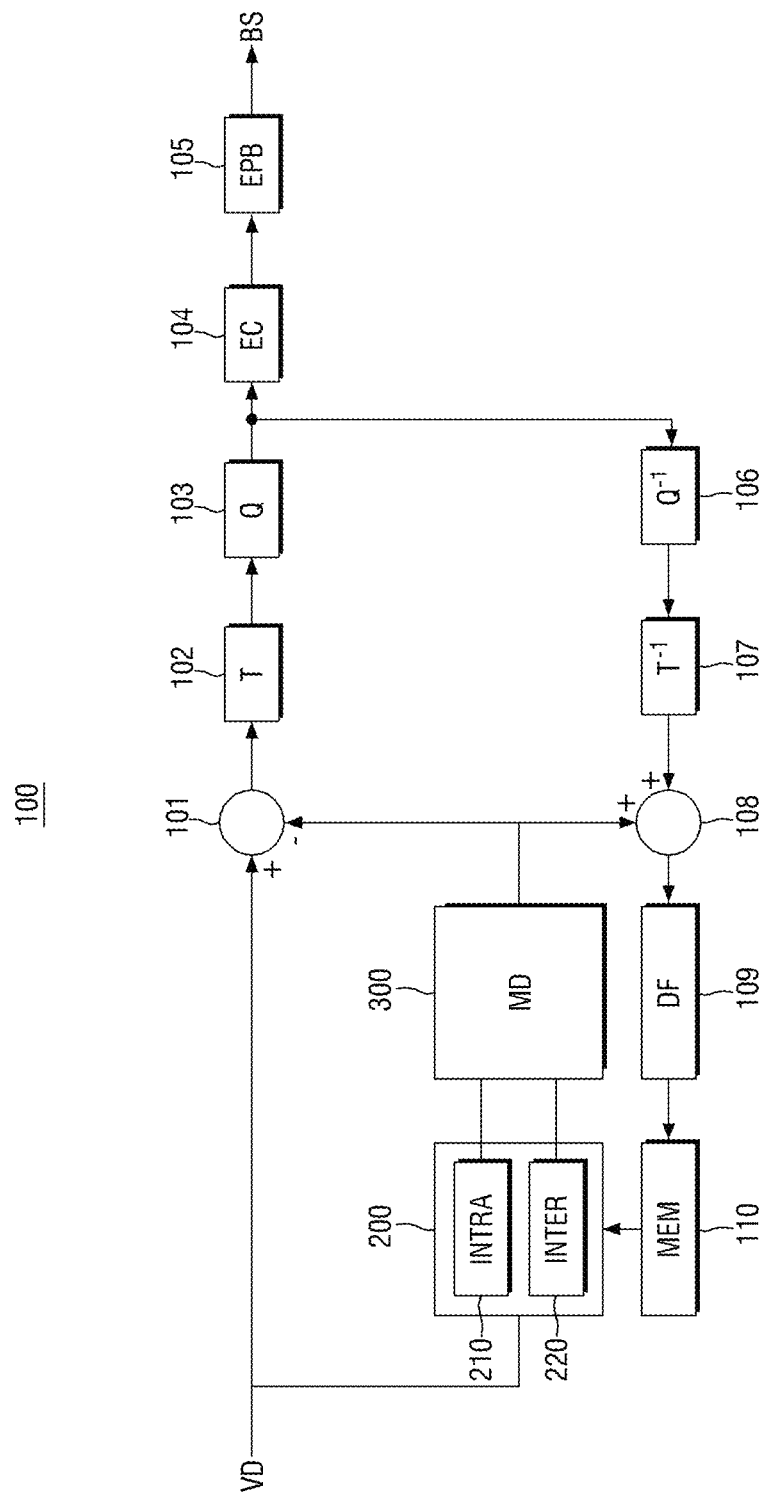
FIG. 1 is a block diagram of a data encoding apparatus according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

According to at least one example embodiment of the inventive concepts, a data encoding apparatus (e.g., data encoding apparatus 100 and/or a data encoding apparatus that includes an apparatus 130 for encoding data) may include or be implemented by one or more circuits or circuitry (e.g., hardware) specifically structured to carry out and/or control some or all of the operations described herein as being performed by a data encoding apparatus (or an element thereof). According to at least one example embodiment of the inventive concepts, a data encoding apparatus (e.g., the data encoding apparatus 100 and/or a data encoding apparatus that includes an apparatus 130 for encoding data) may include or be implemented by a memory and one or more processors executing computer-readable code (e.g., software) that is stored in the memory and includes instructions for causing the one or more processors to carry out and/or control some or all of the operations described herein as being performed by a data encoding apparatus (or an element thereof). According to at least one example embodiment of the inventive concepts, a data encoding apparatus (e.g., the data encoding apparatus 100 and/or a data encoding apparatus that includes an apparatus 130 for encoding data) may be implemented by, for example, a combination of the above-referenced hardware and processors executing computer-readable code. The software (which may also be referred to as a software module) may reside in RAM memory, flash memory, ROM memory, EPROM memory, EEPROM memory, a register, a hard disk, a detachable disk, CD-ROM, or any other form of storage medium known in the art. The storage medium may be coupled to one or more processors, and the one or more processors may read information from the storage medium and may write information to the storage medium. Alternatively, according to at least some example embodiments of the inventive concepts, the storage medium may be integrated with the one or more processors. According to at least some example embodiments of the inventive concepts, the one or more processors and the storage medium may form all or a portion of an application specific integrated circuit (ASIC). Such an ASIC may reside, for example, in a user terminal.

Hereinafter, a data encoding apparatus according to at least one example embodiment of the inventive concepts will be described in detail with reference to FIGS. 1 to 6.

The data encoding apparatus according to at least one example embodiment of the inventive concepts may operate on the basis of H.264 codec, but at least some example embodiments of the inventive concepts are not limited thereto. Unlike other video codecs (for example, MPEG-2, MPEG-4, H.261, and H.263), variable block size motion estimation, ¼ pixel motion vector resolution, and multiple reference picture motion estimation are applied to the H.264 codec, and thus the H.264 codec has improved compression performance compared to other codecs.

Specifically, the data encoding apparatus according to at least one example embodiment of the inventive concepts may determine a coding mode in a macroblock unit by performing intra prediction and inter prediction. A video encoder according to standards, such as MPEG, H.261, H.262, H.263, and H.264, encodes video data in a picture unit. Here, the picture may correspond to the frame in a progressive scanning form, and may also correspond to the field in an interlaced scanning form. The encoded picture is decoded again, and then stored in a decoded picture buffer (DPB) to be used as a reference picture for motion estimation at the time of encoding a subsequently-input picture.

One picture may be divided into macroblock units that have a pixel size of 4×4 or 16×16 and do not overlap each other, and then the picture may be encoded. The intra prediction or inter prediction for each of the sequentially input macroblocks is performed according to the current type of picture, thereby determining an optimal or, alternatively, desired coding model.

According to at least one example embodiment of the inventive concepts, when the current image is an intra picture, only the intra prediction for each of the macroblocks included in the current picture is performed, and when the current image is an inter picture, the intra prediction and inter prediction for each of the macroblocks included in the current picture is performed. Hereinafter, the intra picture may be represented by I picture, and the inter picture may be used as the meaning of including a predictive picture (P picture) and a bi-directional predicative picture (B picture).

Figure 2:
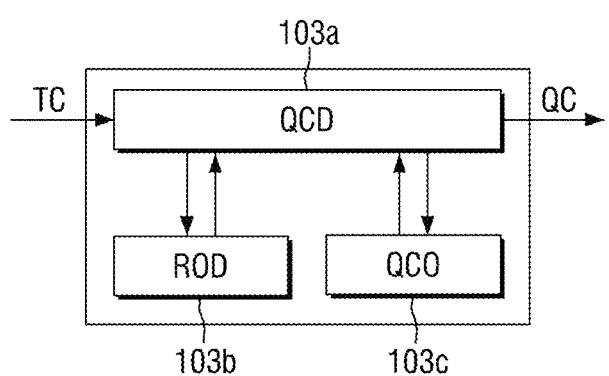
FIG. 2 is a block diagram showing the detailed module of a quantization unit of FIG. 1.
Figure 3:
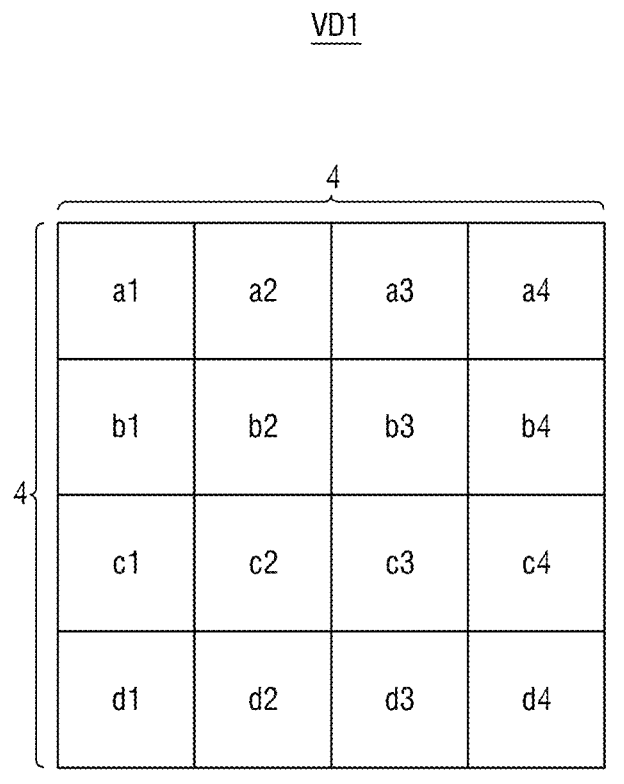
Figure 4:
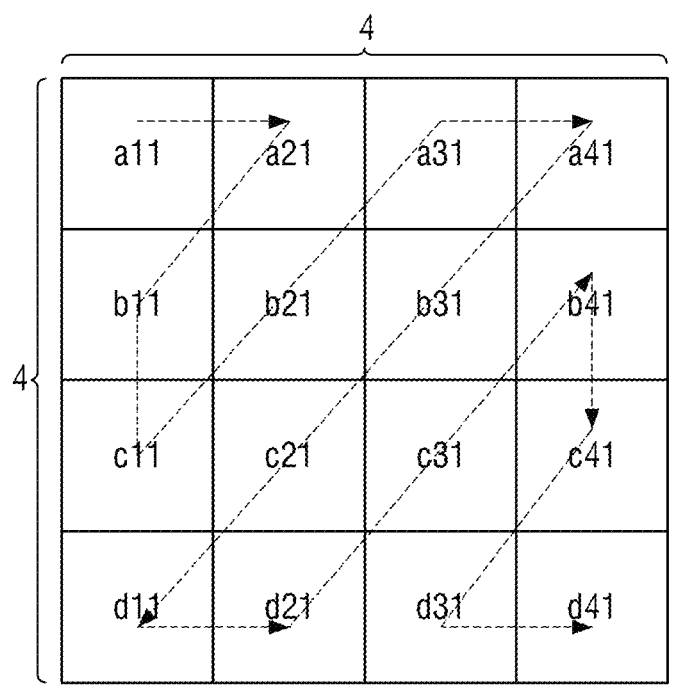
Figure 5:
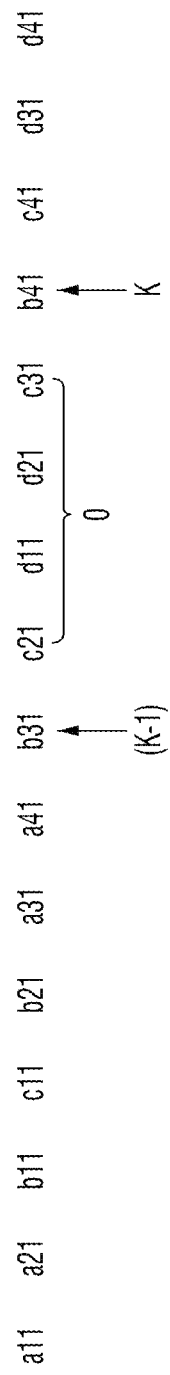
Figure 6:
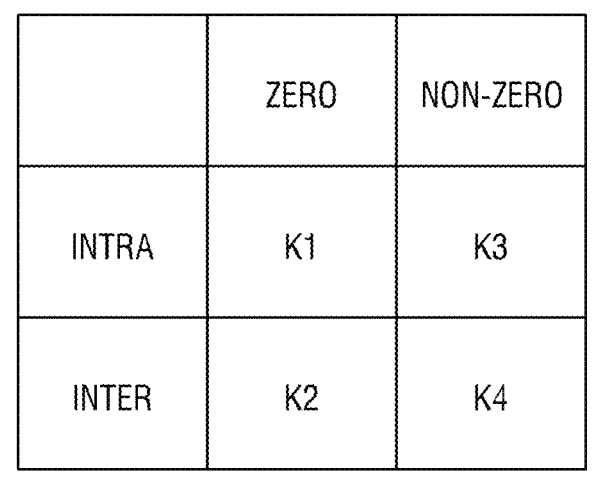

FIG. 1 is a block diagram of a data encoding apparatus according to at least one example embodiment of the inventive concepts. FIG. 2 is a block diagram showing the detailed module of a quantization unit of FIG. 1. FIGS. 3 to 5 are views explaining the operations of the data encoding apparatus according to at least one example embodiment of the inventive concepts. FIG. 6 is an example view of a lookup table.

Referring to FIG. 1, the data encoding apparatus 100 according to at least one example embodiment of the inventive concepts receives video data (VD) input in a macroblock unit. The data encoding apparatus 100 performs intra prediction and inter prediction to determine a coding mode in a macroblock unit, and encodes the video data (VD) in a macroblock unit according to the coding mode.

The data encoding apparatus 100 includes a prediction unit 200, a mode determining unit (MD) 300, a subtractor 101, a transform unit (T) 102, a quantization unit (Q) 103, an entropy coding unit (EC) 104, an inverse quantization unit 106, an inverse transform unit 107, an adder 108, and a deblocking filter (DF) 109, each of which may be embodied as circuits or circuitry, one or more processors executing computer-readable code, or a combination of circuits or circuitry and one or more processors executing computer-readable code. The data encoding apparatus 100 also includes an encoded picture buffer (EPB) 105 and a memory (MEM) 110.

Example structures of the quantization unit 103 are discussed in greater detail below with reference to FIGS. 2 and 8.

The prediction unit 200 includes an intra prediction unit 210 that performs intra prediction for the video data (VD) input in a macroblock unit, and an inter prediction unit 220 that performs inter prediction for the video data (VD) input in a macroblock unit. The prediction unit 200 performs intra prediction and/or inter prediction according to the type of picture, such as I picture (i.e., intra coded picture), P picture (i.e., predictive coded picture), B picture (i.e., bipredictive coded picture), determined by a picture type assignment signal. When the picture type assignment signal (PTA) indicates that the currently-coding picture is an I picture, the inter prediction unit 220 is disabled, and only the intra prediction unit 210 is enabled, so as to perform intra prediction. When the picture type assignment signal (PTA) indicates that the currently-coding picture is P picture or B picture, both the intra prediction unit 210 and the inter prediction unit 220 are enabled, so as to perform intra prediction and inter prediction, respectively.

The intra prediction unit 210 performs intra prediction for determining a coding mode in the current picture without referring to other pictures. The inter prediction unit 220 performs inter prediction for determining a coding mode by referring to the previous picture in the case of P picture and referring to the subsequent picture in the case of B picture.

According to the H.264 standard, the available coding mode of a macroblock is divided into an inter mode and an intra mode. The inter mode includes five motion compensation modes of SKIP, 16×16, 8×16, 16×8, and 8×8, and the 8×8 motion compensation mode includes three sub-modes of 8×4, 4×8, 4×4 with respect to each sub-block. The intra mode includes four 16×16 intra prediction modes and nine 4×4 intra prediction modes.

In order to encode one macroblock into one of the available coding modes, the prediction unit 200 may perform rate-distortion optimization (RDO) as follows.

The intra prediction unit 210 determines an intra mode for minimizing or, alternatively, reducing the rate-distortion cost (Jmode) represented by the following Equation 1 from the aforementioned intra modes.

$$Jmode = DISTmd + Kmd * Rmd \qquad \text{[Equation 1]}$$

Here, Kmd represents the Lagrangian coefficient for mode determination, and Rmd represents the number of bits required for coding a candidate intra mode. DISTmd represents the distortion to the difference in pixels between reconstructed macroblock and input macroblock. That is, DISTmd is the sum of the differences between the pixels of the reconstructed macroblock for the pixels of the input macroblock. As a distortion function, SAD (Sum of Absolute Difference), SAD (Sum of Absolute Transformed Difference), or SSD (Sum of Squared Difference) may be used. As such, according to at least some example embodiments of the inventive concepts, the intra prediction unit 210 calculates Jmodes for each intra mode, and determines the minimum Jmode of the calculated Jmodes (or, alternatively, a Jmode below a reference value from among the calculated Jmodes) as a minimum rate-distortion cost (MCST1).

The inter prediction unit 220 calculates the optimal motion vector for each inter mode other than the aforementioned SKIP. The optimal motion vector may refer to a vector determined based on an inter rate-distortion cost. For example, according to at least some example embodiments of the inventive concepts, the optimal motion vector refers to a motion vector having a minimum inter rate-distortion cost (Jmotion) represented by the following Equation 2 among the candidate motion vectors.

$$Jmotion = DISTmt + Kmt * Rmt \quad \text{[Equation 2]}$$

Here, $Kmt$ represents the Lagrangian coefficient for motion estimation, and $Rmt$ represents the number of bits required for coding data using a candidate mode, a candidate reference picture and a candidate motion vector. $DISTmt$ represents the distortion to the difference in pixels between motion-compensated macroblock and input macroblock. That is, $DISTmt$ is the sum of the differences between the pixels of the motion-compensated macroblock and the input macroblock. As a distortion function, SAD (Sum of Absolute Difference), SAD (Sum of Absolute Transformed Difference), or SSD (Sum of Squared Difference) may be used.

The determination of which kind or kinds of candidate motion vectors to use is generally made according to the size of a search window. The term "search window" refers to a region in which similar blocks are looked up to find the motion vector. When the data encoding apparatus 100 uses a plurality of reference pictures, the above operations for optimal or, alternatively, desired motion estimation are repeatedly performed for each reference picture. As such, the inter prediction unit 220 calculates Jmotions for each candidate reference picture, each candidate motion vector, and each candidate inter mode. For example, according to at least some example embodiments of the inventive concepts, there may be plural candidate reference pictures, plural candidate motion vectors, and plural candidate inter modes, and the inter prediction unit 220 may calculate a plurality of Jmotions by calculating a Jmotion for each combination of a candidate reference picture, a candidate motion vector, and a candidate inter mode from among the plural candidate reference pictures, plural candidate motion vectors, and plural candidate inter modes. Further, the inter prediction unit 220 may determine the minimum Jmotion of the calculated Jmotions (or, alternatively, a Jmotion below a reference value from among the calculated Jmotions) as minimum inter rate-distortion cost (MCST2).

The mode determining unit 300 compares the minimum intra rate-distortion cost (MCST1) and the minimum inter rate-distortion cost (MCST2), and determines a coding mode corresponding to the smaller value among them. The mode determining unit 300 may provide information about the determined coding mode, a reference block corresponding thereto, a motion vector, and the like.

The subtractor 101 subtracts the reference block provided from the mode determining unit 300 from the input macroblock, thereby creating a residual block.

The transform unit 102 performs the spatial transform of the residual block created by the subtractor 101. As the spatial transform, discrete cosine transform (DCT), wavelet transform, or the like may be used. As the result of the spatial transform thereof, transformed coefficients are calculated. In this case, when DCT is used as the spatial transform, a DCT coefficient is calculated, and, when wavelet transform is used as the spatial transform, a wavelet coefficient is calculated.

The quantization unit 103 quantizes the transformed coefficient calculated from the transform unit 102. The term "quantization" refers to an operation for transforming the transformed coefficient expressed by any value into discrete values by dividing the transformed coefficient into predetermined or, alternatively, desired intervals. According to at least some example embodiments of the inventive concepts, the type of quantization performed by the quantization unit 103 may be a scalar quantization, vector quantization, or the like may be used. The scalar quantization is performed by the processes of dividing the transformed coefficient (TC) by quantization step (Qstep), adding a rounding offset value, and then rounding the obtained value down to the integer, as represented by the following Equation 3.

$$QC = TC/Qstep + \text{rounding offset} \quad \text{[Equation 3]}$$

According to at least some example embodiments of the inventive concepts, when wavelet transform is used as the spatial transform, embedded quantization is used (e.g., by the quantization unit 103) as the quantization. The embedded quantization is a method of preferentially encoding a component having a value exceeding the threshold value of the transformed coefficient while changing the threshold value thereof, and may include performing efficient quantization using spatial redundancy. Examples of embedded quantization that may be used (e.g., by the quantization unit 103) include, but are not limited to, Embedded Zerotrees Wavelet Algorithm (EZW), Set Partitioning in Hierarchical Trees (SPIHT), Embedded ZeroBlock Coding (EZBC), or the like may be used. Such an encoding process before entropy coding refers to a loss encoding process.

The data encoding apparatus 100 according to at least one example embodiment of the inventive concepts may be characterized by the quantization unit 103. The quantization unit 103 may determine a first rounding offset value (RO1) using a transformed coefficient (TC), create a first quantized coefficient (QC1) by applying the first rounding offset value (RO1) to the transformed coefficient (TC) (e.g., using Equation 3), determine a second rounding offset value (RO2) using the first quantized coefficient (QC1), and create a second quantized coefficient (QC2) by applying the second rounding offset value (RO2) to the transformed coefficient (TC) (e.g., using Equation 3). In relation to the operation of the quantization unit 103, details thereof will be described later.

The entropy coding unit 104 losslessly encodes the second quantized coefficient (QC2) quantized by the quantization unit 103 and information about intra prediction mode, reference frame number, motion vector, and the like, and creates an output bit stream (BS). As the lossless encoding method, arithmetic coding, such as context-adaptive binary arithmetic coding (CABAC), and variable length coding, such as context-adaptive variable-length coding (CAVLC) may be used by the entropy coding unit 104. The output bit stream (BS) may be output outside the data encoding apparatus 100 after buffering.

The inverse quantization unit 106, the inverse transform unit 107, and the adder 108 are used to restore a reconstructed picture by decoding the loss-encoded data (e.g., data that has not yet been losslessly encoded by the entropy coding unit 104). The inverse quantization unit 106 inversely quantizes the second quantized coefficient (QC2) quantized by the quantization unit 103. This inverse quantization process is an inverse process of quantization. The inverse transform unit 107 inversely spatially changes the result of inverse quantization, and provides this result to the adder 108.

The adder 108 adds up the signal provided from the inverse transform unit 107 and the reference block provided from the mode determining unit 300 to restore the input macroblock. The macroblock restored by the adder 108 is provided to the deblocking filter 109, and the image of a block adjacent to the restored macroblock is provided to the intra prediction unit 210. The deblocking filter 109 performs a deblock-filtering for the boundary of each macroblock. The deblock-filtered data is stored in the memory 110, and is used as a reference picture.

Referring to FIG. 2, the quantization unit 103 may include a quantized coefficient determining unit 103a, a rounding offset determining unit 103b, and a quantized coefficient arranging unit 103c, each of which may be embodied as circuits or circuitry, one or more processors executing computer-readable code, or a combination of circuits or circuitry and one or more processors executing computer-readable code.

The quantized coefficient determining unit 103a receives a transformed coefficient (TC) and determines a first quantized coefficient (QC1). The transform coefficient (TC) may include $1^{st}$ to $n^{th}$ picture data (n is an integer of 2 or more) of macroblock unit. Here, the macroblock unit may include, but is not limited to, a 4×4 pixel or a 16×16 pixel. The first quantized coefficient (QC1) may be determined using the above Equation 3.

The rounding offset determining unit 103b receives the transformed coefficient (TC) and determines a first rounding offset value (RO1). The first rounding offset value (RO1) determined by the rounding offset determining unit 103b is provided to the quantized coefficient determining unit 103a to be used to determine the first quantized coefficient (QC1) in the quantized coefficient determining unit 103a.

In the rounding offset determining unit 103b, the rounding offset value may be determined using the following Equations 4 to 7.

$$a^2 Q_{step}^2 + \lambda R(n) > (1-a)^2 Q_{step}^2 + \lambda R(n+1) \quad \text{[Equation 4]}$$

$$2a - 1 > k\left(\frac{\lambda}{Q_{step}^2}\right) \quad \text{[Equation 5]}$$

$$\lambda \cong 2^{\frac{QP-12}{3}}, Q_{step}^2 \cong 2^{\frac{QP-4}{3}}$$

$$a > \frac{1}{2} + \frac{k}{2} \cdot 2^{-\frac{8}{3}} \quad \text{[Equation 6]}$$

$$\text{Rounding offset} = 1 - a = \frac{1}{2} - k \cdot 2^{-\frac{11}{3}} \cong \frac{1}{2} - k \cdot 0.08 \quad \text{[Equation 7]}$$

The n and a are integer and decimal fraction parts of results of dividing the transformed coefficient (TC) by the quantization step (Qstep) respectively. The R(n) and R(n+1) are bits used to encode the quantized results by using n and n+1 respectively. QP is a quantization parameter.

Here, the rounding offset value may be determined according to a k value. In this case, the k value may be determined using the pre-stored lookup table. Referring to FIG. 6, for intra prediction mode and inter prediction mode, k1 to k4 may be determined whether data level value is 0 or not. The lookup table, for example, may be generated by calculating the average values of R(n+1)-R(n) for each cases. For example, the values of k1 to k4 may be 2, 3, 1 and 1. When k1 to k4 values are determined, the determined k1 to k4 values are applied to Equation 7 above, so as to determine the first rounding offset value (RO1).

The quantized coefficient determining unit 103a may determine the first quantized coefficient (QC1) by applying the first rounding offset value (RO1) to the transformed coefficient (TC). Further, the quantized coefficient determining unit 103a may determine the second quantized coefficient (QC2) by applying the second rounding offset value (RO2) to the transformed coefficient (TC). The method of determining the second quantized coefficient (QC2) will be described with reference to FIGS. 3 to 5. Here, the method of determining the second quantized coefficient (QC2) is described using a macroblock having a pixel size of 4×4, but it is obvious to those skilled in the art that macroblocks having other pixel sizes may be used.

FIG. 3 shows a first video data (VD1) including a transformed coefficient (TC), and FIG. 4 shows a second video data (VD2) including a first quantized coefficient (QC1). As is illustrated in FIGS. 3 and 4, a transformed coefficient (TC) and a quantized coefficient (QC) may each include several coefficient units.

For example, the transformed coefficient (TC) of FIG. 3 may include coefficient units a1~a4, b1~b4, c1~c4, and d1~d4, and the first quantized coefficient (QC1) of FIG. 4 may include coefficient units a11~a41, b11~b41, c1~c41, and d11~d41.

The quantized coefficient arranging unit 103c receives the first quantized coefficient (QC1) to one-dimensionally arrange the coefficient units of the first quantized coefficient (QC1) according to a predetermined or, alternatively, desired rule. In the data encoding apparatus 100, for example, the coefficient units of the first quantized coefficient (QC1) may be arranged one-dimensionally in a zigzag scan manner. As shown in FIG. 5, the coefficient units of the first quantized coefficient (QC1) may be arranged one-dimensionally in the order shown in FIG. 4. In this case, it is assumed that the level value of coefficient unit b41 is the final quantized coefficient unit, which is not 0, the level value of coefficient unit b31 is not 0 and is a quantized coefficient unit nearest to coefficient unit b41. Further, it is assumed that all of the quantized coefficient units between b31 and b41 are 0.

In this case, the second rounding offset value (RO2) may be determined again by applying b41 to the following Equation 8 and the above Equation 7.

$$k = 3 + d/2 \quad \text{[Equation 8]}$$

Here, d is the distance between coefficient unit b31 and b41, and d=7 is shown in FIG. 4. The determination of the second rounding offset value (RO2) may be performed by receiving the first quantized coefficient (QC1) one-dimensionally arranged in the rounding offset determining unit 103b.

The quantized coefficient determining unit 103a may create and output the second quantized coefficient (QC2) by receiving the second rounding offset value (RO2) from the rounding offset determining unit 103b and applying this second rounding offset value (RO2) to the transformed coefficient (TC).

If these procedures are repeated, the level value of data transformed into a frequency domain in a high-frequency area may be transformed to 0, and an output bit stream (BS), the number of bits thereof having been reduced, may be created. That is, the capacity of data is reduced after image compression, so as to reduce the amount of data transmitted to a decoding apparatus.

Figure 7:
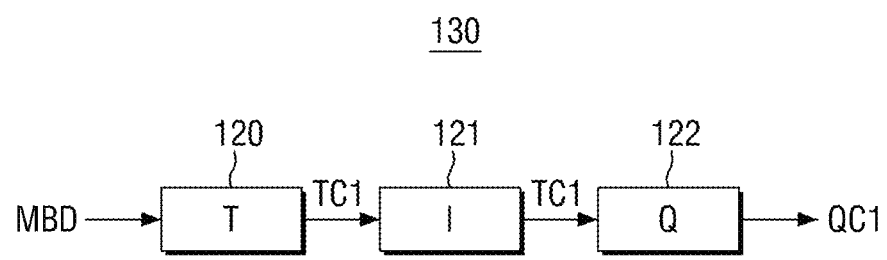
FIG. 7 is a block diagram schematically showing a part of a data encoding apparatus according to at least one example embodiment of the inventive concepts.

FIG. 7 is a block diagram schematically showing a part of a data encoding apparatus according to at least one example embodiment of the inventive concepts.

Referring to FIG. 7, an apparatus 130 for encoding data includes a transform unit 120, an input unit 121, and a quantization unit 122, each of which may be embodied as circuits or circuitry, one or more processors executing computer-readable code, or a combination of circuits or circuitry and one or more processors executing computer-readable code.

The transform unit 120 receives a macroblock data (MBD), and transforms the picture data of the spatial area into the picture data of the frequency area. In this case, the macroblock data (MBD) may be a residual block obtained by subtracting a predicative picture from the original picture.

The transform unit 120 performs the spatial transform of the residual block to create a first transformed coefficient (TC1). As the spatial transform, discrete cosine transform (DCT), wavelet transform, or the like may be used.

The input unit 121 serves to receive the first transformed coefficient (TC1) of a macroblock unit and transmit this first transformed coefficient (TC1) to the quantization unit 122. The input unit 121 may include a physical circuit formed separately with respect to the quantization unit 122.

The quantization unit 122 receives the first transformed coefficient (TC1), and quantizes this first transformed coefficient (TC1) to create a first quantized coefficient (QC1) and output the first quantized coefficient (QC1). The first quantized coefficient (QC1) is provided to another circuit (for example, another quantization unit or rounding offset determining unit) to be used to perform the aforementioned process of determining a rounding offset value and the aforementioned process of determining a quantized coefficient.

Figure 8:
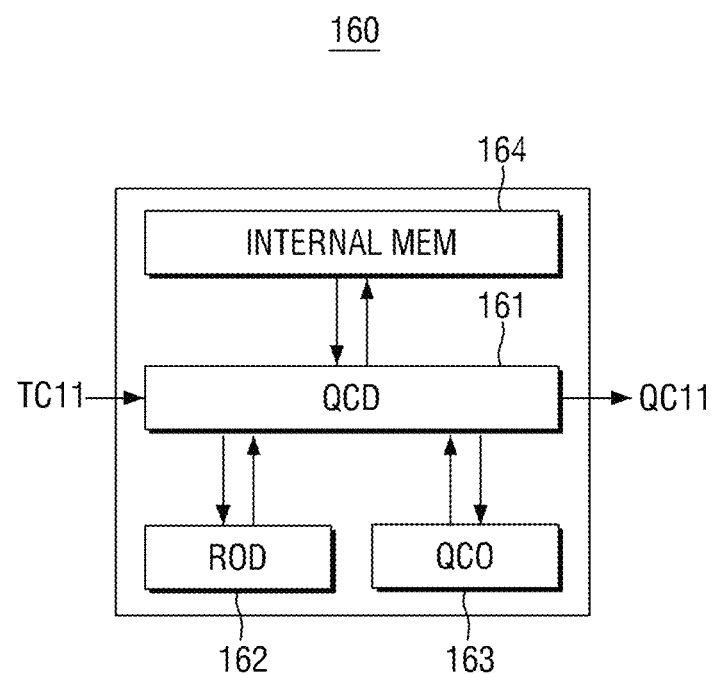
FIG. 8 is a block diagram showing the detailed module of a quantization unit of a data encoding apparatus according to at least one example embodiment of the inventive concepts.

FIG. 8 is a block diagram showing the detailed module of a quantization unit of a data encoding apparatus according to at least one example embodiment of the inventive concepts.

Referring to FIG. 8, a quantization unit 160 includes a quantized coefficient determining unit 161, a rounding offset determining unit 162, and a quantized coefficient arranging unit 163, each of which may be embodied as circuits or circuitry, one or more processors executing computer-readable code, or a combination of circuits or circuitry and one or more processors executing computer-readable code. The quantization unit 160 also includes an internal memory 164. The quantization unit 160 may be an additional example of the operation and/or structure of the quantitation unit 103 of FIG. 1.

The quantized coefficient determining unit 161, the rounding offset determining unit 162, and the quantized coefficient arranging unit 163 may be operated in the substantially same manner as the aforementioned quantized coefficient determining unit 103a, rounding offset determining unit 103b, and quantized coefficient arranging unit 103c.

The internal memory 164 may store a lookup table, and the lookup table may store the predetermined or, alternatively, desired rounding offset value. That is, the rounding offset value corresponding to the aforementioned k value may be previously stored. If the number of cases that can be determined by the k value is limited, the data encoding speed can be improved by calculating the rounding offset value using the previously stored lookup table.

Figure 9:
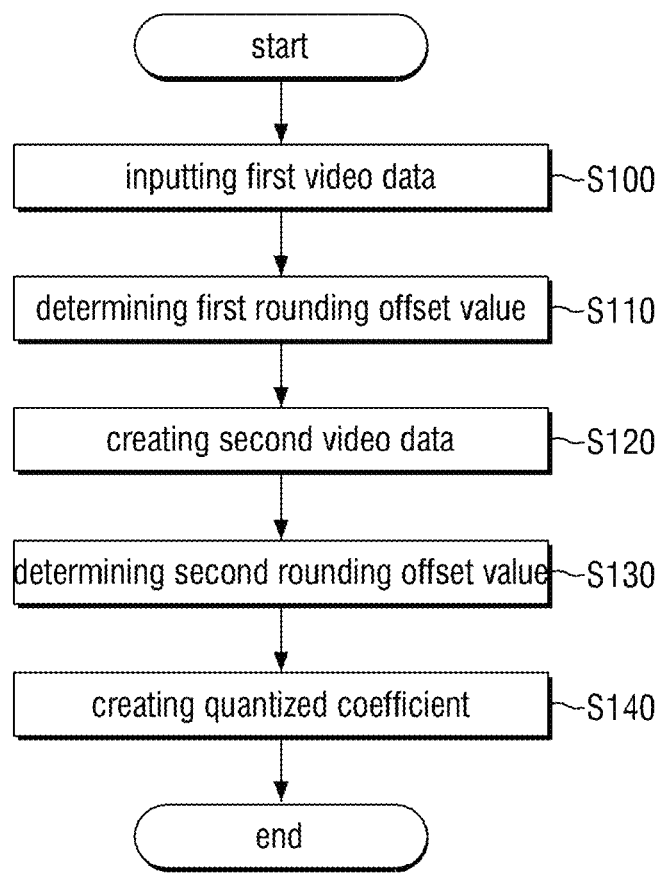
FIG. 9 is a flowchart sequentially showing a method of encoding data according to at least one example embodiment of the inventive concepts.

FIG. 9 is a flowchart sequentially showing a method of encoding data according to at least one example embodiment of the inventive concepts.

Referring to FIG. 9, in the method of encoding data according to at least one example embodiment of the inventive concepts, first, first video data (VD1) is inputted in a macroblock unit (S100). Here, the first video data (VD1) may be data transformed into a frequency domain. That is, the first video data (VD1) may be a transformed coefficient (TC) frequency-transformed through the transform unit 102. The macroblock unit may be, but is not limited to, a 4×4 pixel or a 16×16 pixel.

Subsequently, a first rounding offset value (RO1) is determined using the first video data (VD1) (S110). The determination of the first rounding offset value (RO1) may be performed according to the level value of the prediction mode or the first video data (VD1). For example, for intra prediction mode, inter prediction mode, the first rounding offset value (RO1) may be determined by whether the data level value is 0 or not. The first rounding offset value (RO1) may be determined by using the previously stored lookup table or by calculating the first rounding offset value (RO1) according to, for example, Equations 5-7.

Subsequently, second video data (VD2) is created by applying the first rounding offset value (RO1) to the first video data (VD1) (S120). The first rounding offset value (RO1) may be applied to the first video data (VD1) using Equation 3 above.

Subsequently, a second rounding offset value (RO2) is determined using the second video data (VD2) (S120). The determination of the second rounding offset value (RO2) may be performed using Equations 7 and 8 above. The second rounding offset value (RO2) may be determined by using the previously stored lookup table or by calculating the second rounding offset value (RO2) according to, for example, Equations 5-7.

Subsequently, a quantized coefficient (QC) is created by applying the second rounding offset value (RO2) to the first video data (VD1) (S140) (e.g., using Equation 3).

Figure 10:
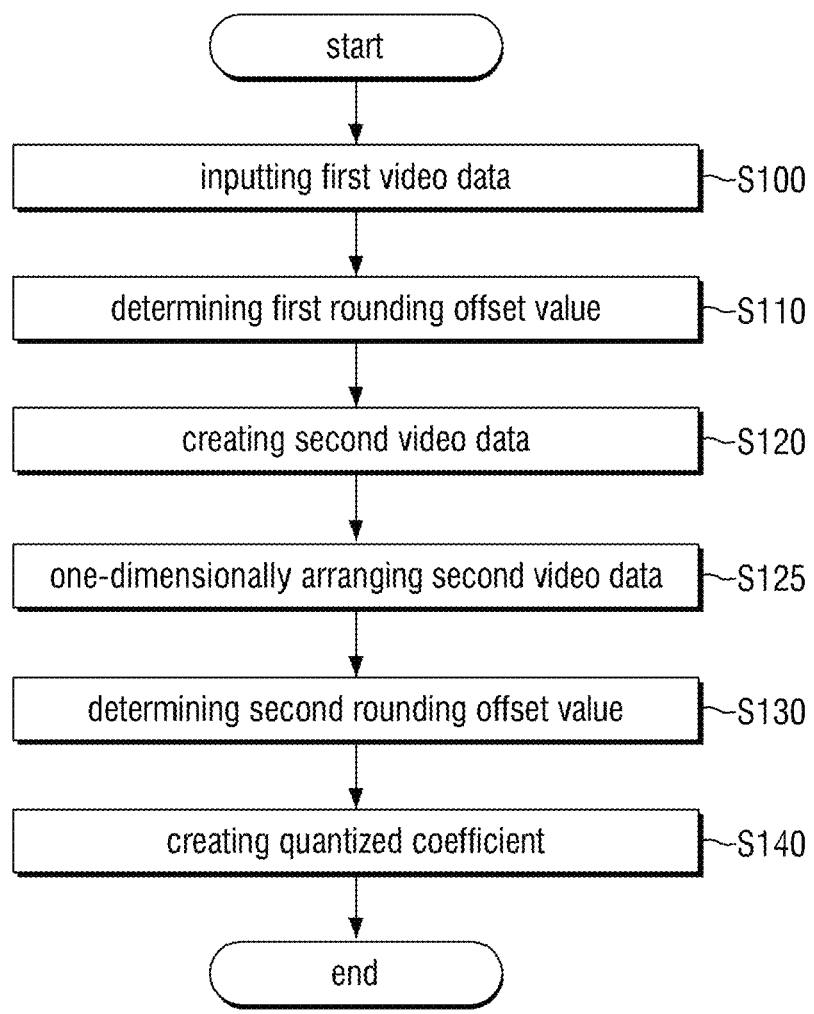
FIG. 10 is a flowchart sequentially showing a method of encoding data according to another embodiment of at least some example embodiments of the inventive concepts.

FIG. 10 is a flowchart sequentially showing a method of encoding data according to another embodiment of at least some example embodiments of the inventive concepts.

Referring to FIG. 10, in the method of encoding data according to another embodiment of at least some example embodiments of the inventive concepts, first video data (VD1) is inputted in a macroblock unit (S100), a first rounding offset value (RO1) is determined using the first video data (VD1) (S110) (e.g., using Equations 5-7), and second video data (VD2) is created by applying the first rounding offset value (RO1) to the first video data (VD1) (e.g., using Equation 3) (S120).

Subsequently, a plurality of data included in the second video data (VD2) is arranged one-dimensionally (S125). The arrangement of the plurality of data may be performed in the above-mentioned zigzag manner.

Subsequently, a second rounding offset value (RO2) is determined using the one-dimensionally-arranged second video data (VD2) (e.g., using Equations 5-7) (S130). Subsequently, a quantized coefficient (QC) is created by applying the second rounding offset value (RO2) to the first video data (VD1) (S140) (e.g., using Equation 3).

Figure 11:
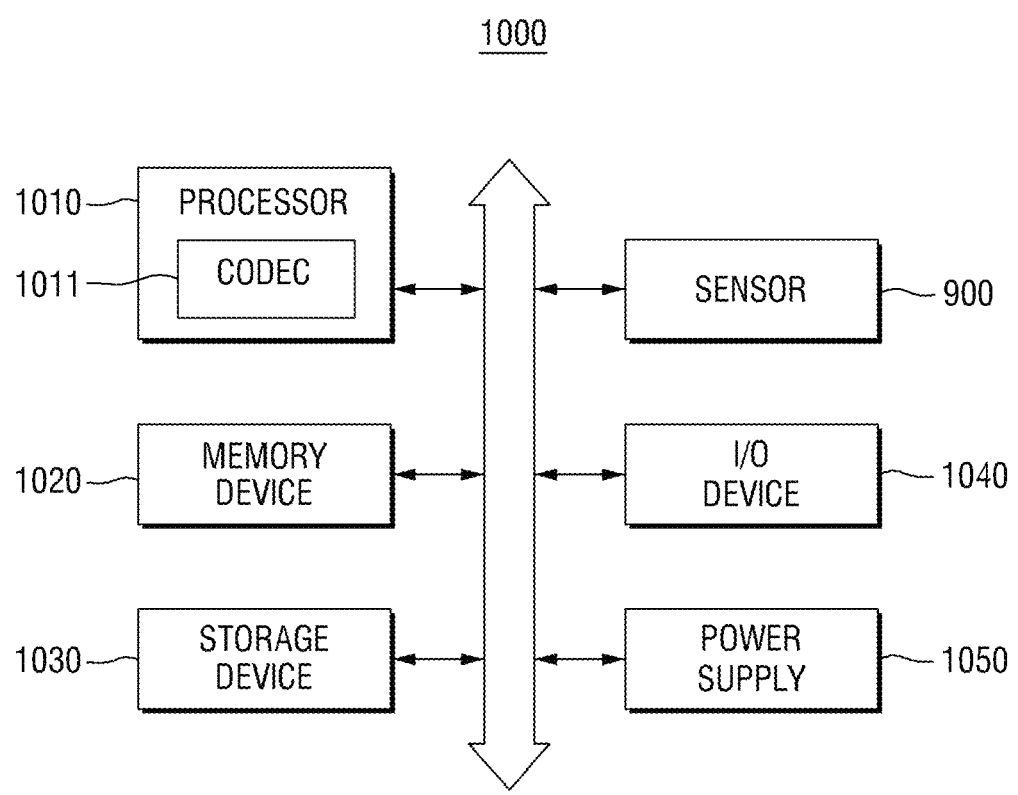
FIG. 11 is a block diagram showing a computing system including the data encoding apparatus according to at least one example embodiment of the inventive concepts.

FIG. 11 is a block diagram showing a computing system including the data encoding apparatus according to at least one example embodiment of the inventive concepts.

Referring to FIG. 11, the computing system 1000 includes a processor 1010, a memory device 1020, a storage device 1030, an input/output device 1040, a power supply 1050, and an imaging device 900. Meanwhile, the computing system 1000 may further include ports used in communicating with a video card, a sound card, a memory card, or other electronic appliances.

The processor 1010 may perform specific calculations or tasks. The processor 1010 may include a video codec 1011. The video codec 1011 may include the data encoding apparatus having been described with reference to FIGS. 1 to 8 (e.g., the data encoding apparatus 100). The video codec 1011 may further include a data decoding apparatus for decoding the compressed data encoded by the data encoding apparatus. The data encoding apparatus and the data decoding apparatus may be integrated with each other. In some embodiments, the processor 1010 may be a microprocessor or a central processing unit (CPU). The processor 1010 may communicate with the memory device 1020, the storage device 1030, the imaging device 900, and the input/output device 1040 through an address bus, a control bus, and a data bus.

In some embodiments, the processor 1010 may also be connected to an expansion bus, such as a peripheral component interconnect (PCI) bus. The memory device 1020 may store data necessary for operation of the computing system 1000. Examples of the memory device 1020 may include DRAM, mobile DRAM, SRAM, PRAM, FRAM, RRAM, and MRAM.

The storage device 1030 may include a solid state drive, a hard disk drive, and CD-ROM. The input/output device 1040 may include input means, such as keyboards, keypads, and mice, and output means, such as printers and displays.

The power supply 1050 may supply a voltage necessary for operation of the computing system 1000.

The imaging device 900 is connected to the processor 1010 through the above buses and other communication links to perform communication. The imaging device 900 and the processor 1010 may be integrated into one chip together, and may also be respectively integrated into different chips.

The computing system may be implemented in various forms of packages. For example, at least some components of the computing system 1000 may be implemented using packages, such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat pack (TQFP), Small Outline (SOIC), Shrink Small Outline Package (SSOP), Thin Small Outline (TSOP), Thin Quad Flat pack (TQFP), System In Package (SIP), Multi Chip Package (MCP), Wafer-level Fabricated Package (WFP), and Wafer-Level Processed Stack Package (WSP).

Meanwhile, the computing system 1000 will be interpreted as any computing system executing the data encoding method according to at least one example embodiment of the inventive concepts. Examples of the computing system 1000 may include digital cameras, mobile phones, personal digital assistants (PDAs), and smart phones.

Figure 12:
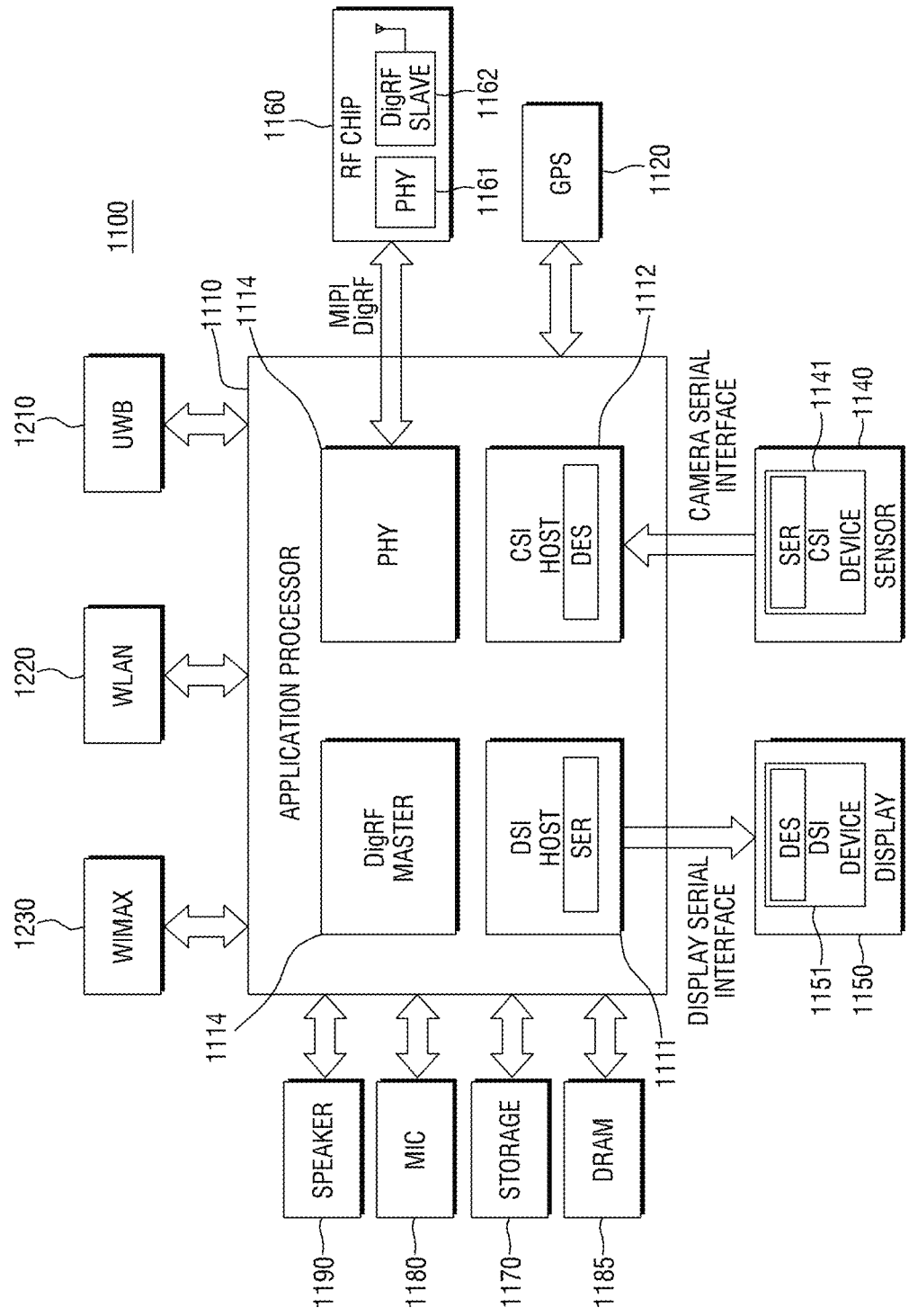
FIG. 12 is a block diagram showing an example of interface used in the computing system of FIG. 11.

FIG. 12 is a block diagram showing an example of interface used in the computing system of FIG. 11.

Referring to FIG. 12, the computing system 1100 may be realized as a data processing apparatus that can use and support an MIPI interface, and may include an application processor 1110, an image sensor 1140, and a display 1150.

The CSI host 1112 of the application processor 1110 may perform a serial communication with the CSI device 1141 of the image sensor 1140 through a camera serial interface (CSI).

In some embodiments, the CSI host 1112 may include a deserializer (DES), and the CSI device 1141 may include a serializer (SER). The DSI host 1111 of the application processor 1110 may perform a serial communication with the DSI device 1151 of the display 1150 through a display serial interface (DSI).

In some embodiments, the DSI host 1111 may include a serializer (SER), and the DSI device 1151 may include a deserializer (DES). The computing system 1100 may further include a radio frequency (RF) chip 1160 that can communicate with the application processor 1110. The PHY 1113 of the computing system 1100 and the PHY 1161 of the RF chip 1160 may transmit and receive data according to MIPI (Mobile Industry Processor Interface) DigRF. The application processor 1110 may further include a DigRF MASTER 1114 that controls the transmission and reception of data according to the MIPI DigRF.

Meanwhile, the computing system 1100 may include a global positioning system (GPS) 1120, a storage 1170, a mic 1180, dynamic random access memory (DRAM) 1185, and a speaker 1190. The computing system 1100 may perform a communication using an ultra wideband (UWB) 1210, a wireless local area network (WLAN) 1220, and a worldwide interoperability for microwave access (WIMAX) 1230. However, the configuration of the computing system 1100 and the interface illustrated in FIG. 12 are examples, and at least some example embodiments of the inventive concepts are not limited thereto.

It will understood to those skilled in the art that the data encoding apparatus can be realized in the form of systems, methods, and other products including a computer-readable program code stored in a computer-readable medium. The computer-readable recording medium may be any type of medium provided in an instruction execution system, equipment or device or connected thereto to store or include program.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A data encoding apparatus, comprising:
a memory storing computer-readable instructions; and
one or more processors configured to execute the computer-readable instruction such that the one or more processors are configured to,
  receive a residual block including video data,
  transform the video data from a spatial domain into a frequency domain to create a transformed coefficient,
  quantize the transformed coefficient to create a first quantized coefficient,
  based on the first quantized coefficient, quantize the transformed coefficient to create a second quantized coefficient different from the first quantized coefficient, and
  perform an entropy coding for the second quantized coefficient to generate an output bit stream,
wherein, the first quantized coefficient is created by applying a first rounding offset value to the transformed coefficient, and the second quantized coefficient is created by applying a second rounding offset value to the transformed coefficient.

2. The data encoding apparatus of claim 1, wherein the one or more processors are configured to execute the computer-readable instructions such that the one or more processors are configured to create the quantized coefficient using a previously stored lookup table.

3. The data encoding apparatus of claim 1, wherein the one or more processors are configured to execute the computer-readable instructions such that the one or more processors are configured to calculate the first or second rounding offset value based on a first equation, and create the quantized coefficient based on the first or second rounding offset value.

4. The data encoding apparatus of claim 3, wherein the one or more processors are configured to execute the computer-readable instructions such that the one or more processors are configured to determine the first rounding offset value based on a prediction mode or a level value of the first quantized coefficient.

5. The data encoding apparatus of claim 4, wherein the one or more processors are configured to execute the computer-readable instructions such that the one or more processors are configured to determine the second rounding offset value by using a number of quantized coefficients having a level value of 0 between the $k^{th}$ quantized coefficient and the $k-1^{th}$ quantized coefficient.

6. The data encoding apparatus of claim 5, wherein the $k^{th}$ quantized coefficient is a final kth quantized coefficient having a level value of not 0, and the $k-1^{th}$ quantized coefficient is a quantized coefficient that has a level value of not 0 and is nearest to the $k^{th}$ quantized coefficient.

7. A data encoding method, comprising:
receiving first video data in a macroblock unit;

determining a first rounding offset value using a transformed coefficient of the first video data;

creating second video data including a first quantized coefficient by applying the first rounding offset value to the first video data;

determining a second rounding offset value using the first quantized coefficient of the second video data; and creating a second quantized coefficient by applying the second rounding offset value to the first video data.

8. The data encoding method of claim 7, wherein the first rounding offset value is determined depending on a prediction mode or a level value of the first video data.

9. The data encoding method of claim 7, further comprising:

one-dimensionally arranging a plurality of data including the second video data between the creating of the second video data and the determining of the second rounding offset value.

10. The data encoding method of claim 9, wherein the determining of the second rounding offset value is performed using a number of data having a level value of 0 between first data and second data.

11. The data encoding method of claim 10, wherein the first data is final data having a level value of not 0 in the second video data.

12. The data encoding method of claim 11, wherein the second data is final data having a level value of not 0 and nearest to the first data in the second video data.

13. The data encoding method of claim 7, wherein the determining of the first or second rounding offset value is performed by using a lookup table previously stored in memory or by performing calculation depending on predetermined equation.

14. The data encoding method of claim 7, wherein the first video data is data transformed into a frequency domain.

15. The data encoding method of claim 7, wherein the macroblock unit includes 4×4 pixel or 16×16 pixel.

* * * * *